US011082581B2

(12) United States Patent
Misawa (10) Patent No.: US 11,082,581 B2
(45) Date of Patent: Aug. 3, 2021

(54) IMAGE PROCESSING APPARATUS AND METHOD FOR CONTROL TO SMOOTH A CHARACTER REGION OF A BINARY IMAGE AND PERFORM CHARACTER RECOGNITION

(71) Applicant: CANON KABUSHIKI KAISHA, Tokyo (JP)

(72) Inventor: Reiji Misawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/653,866

(22) Filed: Oct. 15, 2019

(65) Prior Publication Data
US 2020/0134309 A1   Apr. 30, 2020

(30) Foreign Application Priority Data
Oct. 26, 2018   (JP) .............................. JP2018-202033

(51) Int. Cl.
*H04N 1/40* (2006.01)
*G06K 9/20* (2006.01)
(Continued)

(52) U.S. Cl.
CPC ....... *H04N 1/40075* (2013.01); *G06K 9/0051* (2013.01); *G06K 9/00456* (2013.01);
(Continued)

(58) Field of Classification Search
CPC ........... H04N 1/00331; H04N 1/40062; H04N 1/40068; H04N 1/40075; H04N 1/40081;
(Continued)

(56) References Cited

U.S. PATENT DOCUMENTS 5,761,344 A * 6/1998 Al-Hussein ........ G06K 9/00456
382/237
6,172,769 B1 * 1/2001 Rao .................... H04N 1/40075
358/1.9
(Continued)

FOREIGN PATENT DOCUMENTS

JP        2003-8909 A      1/2003

OTHER PUBLICATIONS

Russ et al, "The Image Processing Handbook", Boca Raton, Florida: CRC Press, Seventh Edition, Chapter 4, pp. 163-242 (Year: 2016).*
(Continued)

*Primary Examiner* — Scott A Rogers
(74) *Attorney, Agent, or Firm* — Canon U.S.A., Inc. IP Division (57) ABSTRACT

An image processing apparatus includes a reading unit configured to read an image of a document and generate image data, a first binarization unit configured to generate binary image data by performing halftone processing on the image data generated by the reading unit, a smoothing unit configured to perform smoothing processing on a character region of the binary image data, a second binarization unit configured to perform binarization processing on the character region having been subjected to the smoothing processing by the smoothing unit, and a character recognition unit configured to perform character recognition processing on the character region having been subjected to the binarization processing by the second binarization unit.

15 Claims, 10 Drawing Sheets

(51) Int. Cl.
*G06K 9/44* (2006.01)
*H04N 1/405* (2006.01)
*H04N 1/00* (2006.01)
*G06K 9/82* (2006.01)
*G06T 5/00* (2006.01)
*G06K 9/00* (2006.01)
*G06K 9/46* (2006.01)
*H04N 1/60* (2006.01)

(52) U.S. Cl.
CPC ............ *G06K 9/2054* (2013.01); *G06K 9/44* (2013.01); *G06K 9/4642* (2013.01); *G06K 9/82* (2013.01); *G06T 5/002* (2013.01); *H04N 1/00331* (2013.01); *H04N 1/405* (2013.01); *H04N 1/40062* (2013.01); *H04N 1/6072* (2013.01); *G06K 2209/01* (2013.01); *H04N 2201/0094* (2013.01)

(58) Field of Classification Search
CPC ..... H04N 1/40093; H04N 1/405–4058; H04N 1/409; H04N 1/4092; H04N 1/52; H04N 1/58; H04N 1/6072; G06K 15/1872–1881; G06K 9/00442; G06K 9/00456; G06K 9/00463; G06K 9/00496; G06K 9/00503; G06K 9/0051; G06K 9/40; G06K 9/44; G06K 9/80; G06K 9/82; G06K 9/46–527; G06K 2209/01; G06K 7/146; G06T 7/10–194; G06T 5/002; G06T 5/003; G06T 5/005; G06T 5/40

See application file for complete search history.

(56) References Cited

U.S. PATENT DOCUMENTS

| | | | | |
|---|---|---|---|---|
| 7,312,900 | B2* | 12/2007 | Furukawa | H04N 1/40075 358/3.08 |
| 8,965,117 | B1* | 2/2015 | Rybakov | G06K 9/6267 382/165 |
| 2002/0154339 | A1* | 10/2002 | Kuo | G06T 5/002 358/3.08 |
| 2004/0169890 | A1* | 9/2004 | Maurer | H04N 1/40075 358/3.08 |
| 2004/0240737 | A1* | 12/2004 | Lim | G06K 9/325 382/182 |
| 2014/0086473 | A1* | 3/2014 | Nakamura | G06K 9/38 382/137 |
| 2019/0279018 | A1* | 9/2019 | Milis | G06K 9/3233 |

OTHER PUBLICATIONS

Zhang et al, "Image inverse halftoning and descreening: a review", Springer Science+Business Media, LLC, p. 21021-21039 (Year: 2019).*

* cited by examiner

| 1/9 | 1/9 | 1/9 |
|-----|-----|-----|
| 1/9 | 1/9 | 1/9 |
| 1/9 | 1/9 | 1/9 |

IMAGE PROCESSING APPARATUS AND METHOD FOR CONTROL TO SMOOTH A CHARACTER REGION OF A BINARY IMAGE AND PERFORM CHARACTER RECOGNITION

BACKGROUND

Field

The present disclosure relates to an image processing apparatus, a method for controlling the image processing apparatus, and a storage medium.

Description of the Related Art

Some image processing apparatuses read a document to generate image data (multivalued image data), perform character recognition processing on the generated image data, and add a character code to the image data, thereby generating a portable document format (PDF) file in which a character string is searchable for. The character recognition processing here indicates optical character reader (OCR) processing.

In the OCR processing commonly known, character recognition is performed on binary image data that is obtained by binarizing the multivalued image data generated through reading. Examples of the method for binarizing the image data include an error diffusion method. In the error diffusion method, an error between a pixel value of a pixel of interest and a pixel value after halftone processing is diffused to peripheral pixels.

In a case where the error diffusion method and the halftone processing, such as screen processing, are used in binarization suitable for a photo image region, however, the OCR processing is not necessarily performable on all of character regions of input image data. For example, in a case where the error diffusion is performed on a black character on a white background, background pixels and character pixels are easily separated. In contrast, in a case where the error diffusion is performed on a black character on a background with high density, isolated pixels may dot around the character due to binarization through the error diffusion method. Such binary image data is not suitable for the OCR processing, and a character in the image data is not recognized as a character or is erroneously recognized.

Japanese Patent Application Laid-Open No. 2003-8909 discusses a method in which it is determined whether the number of isolated pixels in a character region of binary image data is equal to or larger than a threshold, and in a case where the number of isolated pixels is equal to or larger than the threshold, a luminance histogram of the region is calculated from multivalued image data before binarization and re-binarization is performed to separate background pixels and character pixels.

SUMMARY

In a case of performing the OCR processing on the above-described binary image data, the conventional image processing apparatus that reads a document to obtain image data, stores the obtained image data in a line buffer, and performs image processing, does not store multivalued image data before binarization. Thus, re-binarization discussed in Japanese Patent Application Laid-Open No. 2003-8909 cannot be performed. In other words, in the conventional image processing apparatus that performs the halftone processing without continuously storing the multivalued image data before the binarization, a character included in the image data may not be recognized as an appropriate character through the OCR processing, which reduces a recognition rate of a character in the OCR processing.

The present disclosure features, among other things, improvement of a recognition rate of a character included in the read image in the image processing apparatus that does not continuously store the multivalued image data before the binarization.

According to an aspect of the present disclosure, an image processing apparatus includes a reading unit configured to read an image of a document and generate image data, a first binarization unit configured to generate binary image data by performing halftone processing on the image data generated by the reading unit, a smoothing unit configured to perform smoothing processing on a character region of the binary image data, a second binarization unit configured to perform binarization processing on the character region having been subjected to the smoothing processing by the smoothing unit, and a character recognition unit configured to perform character recognition processing on the character region having been subjected to the binarization processing by the second binarization unit.

Further features of the present disclosure will become apparent from the following description of exemplary embodiments with reference to the attached drawings.

DESCRIPTION OF THE EMBODIMENTS

Exemplary embodiments of the present disclosure will be described below with reference to accompanying drawings. Configurations described in the following exemplary embodiments are illustrative, and embodiments are not limited to the described configurations.

Figure 1:
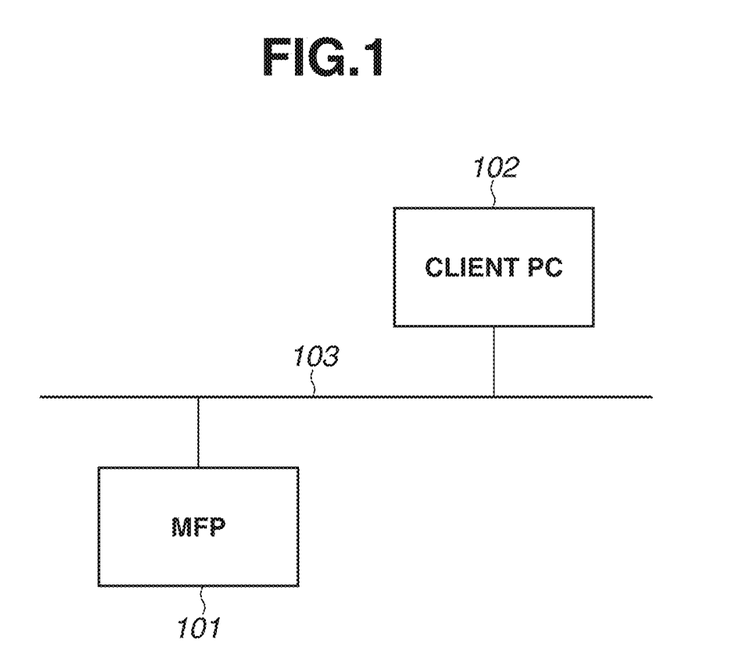
FIG. 1 is a diagram illustrating an example of a configuration of a print system.

A first exemplary embodiment of the present disclosure will be described below. FIG. 1 is a diagram illustrating an example of a configuration of a print system. The print system in FIG. 1 includes a multifunctional peripheral (MFP) 101 that is an image forming apparatus, and a client personal computer (PC) 102 that is an information processing apparatus connected through a network 103. The network 103 may be a network using Ethernet wired communication or a network using a wireless communication, such as a wireless local area network (LAN).

The MFP 101 reads an image of a document, generates image data, and generates, for example, a portable document format (PDF) file based on the generated image data. The MFP 101 then transmits the PDF file to the client PC 102 via the network 103. The file to be generated at this time is not limited to the PDF file, and may be a Joint Photographic Experts Group (JPEG) file and a Tagged Image File Format (TIFF) file.

In the present exemplary embodiment, a description will be provided of a case where the PDF file with an optical character reader (OCR) result is designated as a data format. The details of the PDF file with an OCR result will be described below.

Figure 2:
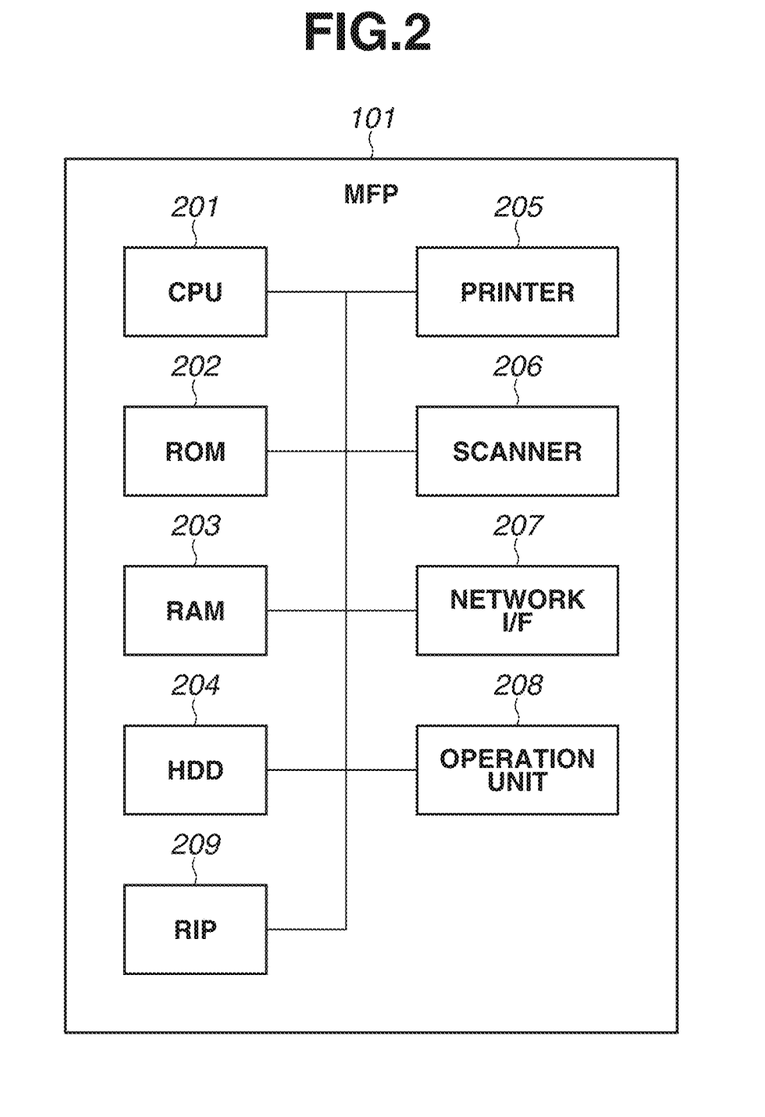
FIG. 2 is a diagram illustrating an example of a hardware configuration of a multifunctional peripheral (MFP).

FIG. 2 is a diagram illustrating an example of a hardware configuration of the MFP 101. The MFP 101 includes a central processing unit (CPU) 201, a read-only memory (ROM) 202, a random access memory (RAM) 203, a hard disk drive (HDD) 204, a printer 205, a scanner 206, a network interface (I/F) 207, and an operation unit 208.

The MFP 101 further includes a raster image processor (RIP) 209.

The CPU 201 controls the various types of hardware devices 204 to 208 included in the MFP 101, to implement functions included in the MFP 101. The CPU 201 transmits a signal to each of the hardware devices through a bus line to perform mutual data communication with the other hardware devices.

The ROM 202 stores a program and various types of data used by the CPU 201. The RAM 203 is a work memory temporarily storing a program and data used for calculation by the CPU 201. The HDD 204 stores, for example, various types of data and various programs. An example in which the MFP 101 uses the HDD as an auxiliary storage device is described in the present exemplary embodiment; however, a nonvolatile memory, such as a solid state drive (SSD), may be used as the auxiliary storage device.

The printer 205 is a unit implementing a print function, and prints an image on a sheet based on image data included in a print job transmitted from the client PC 102.

The scanner 206 is a unit implementing a scan function, and is a reading unit that optically reads a document and converts the read document into image data.

The CPU 201 of the MFP 101 controls operation of the MFP 101 based on a control program in the MFP 101. More specifically, the CPU 201 executes an operating system (OS) for control of the MFP 101 and a driver program for control of a hardware interface. Application programs on the OS are mutually operated to perform operation and control of the function desired by a user. The OS and the various programs are stored in the ROM 202, and are executed after being read from the ROM 202 to the RAM 203.

The network I/F 207 of the MFP 101 may be a LAN_I/F for wired connection or may be connected with a universal serial bus (USB)-LAN adapter. The network I/F 207 may be a LAN_I/F for wireless connection.

The network I/F 207 of the MFP 101 is connected to the client PC 102 via the network 103.

The operation unit 208 is a user interface for the user using the MFP 101 to use, for example, the printer 205 and the scanner 206, and is a reception unit receiving operation and input as, for example, a touch panel. The operation unit 208 can also be used as a display unit displaying information on the MFP 101. An operation device and a display device of the MFP 101 according to the present exemplary embodiment may be connected to outside.

The RIP 209 is a hardware module that performs rasterizing processing to rasterize a page description language (PDL) into a raster image. An example in which the RIP 209 is incorporated as a hardware will be described in the present exemplary embodiment; however, the RIP 209 may be stored as software in the ROM 202.

Figure 3:
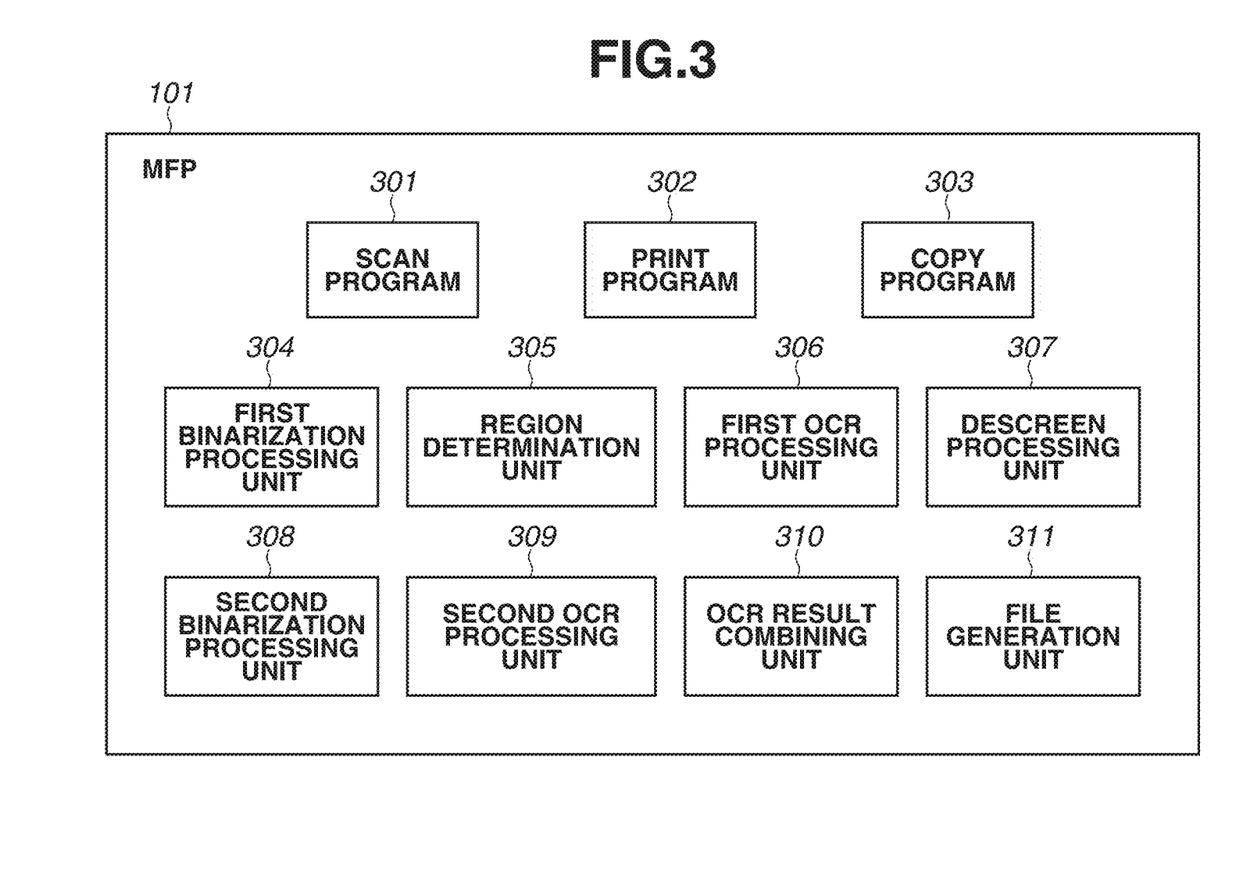
FIG. 3 is a diagram illustrating an example of a software configuration of the MFP.

FIG. 3 is a diagram illustrating an example of a software configuration of the MFP 101. Each software may be configured to function when the CPU 201 executes the program stored in the ROM 202, or a part or all of the software may be configured by a hardware device, such as an application specific integrated circuit (ASIC) and an electronic circuit.

The CPU 201 runs a scan program 301 to control the scanner 206 to perform scan processing in which the document is read and the image data is generated.

The CPU 201 runs a print program 302 to control the printer 205 and the RIP 209 to store the print job received through the network I/F 207 in the HDD 204, and printing is performed based on print setting information included in the print job.

The CPU 201 runs a copy program 303 to control the scanner 206 and the printer 205 to perform copy processing in which an image is printed on a sheet based on image data generated through reading of a document.

The CPU 201 runs a first binarization processing unit 304 to generate binary image data from multivalued image data generated through scanning and reading of an image of a document. In generating the binary image data from the multivalued image data, binarization is performed with use of an error diffusion method that is a well-known technique, in order to prevent the occurrence of moiré on the generated image data. The image data generated through reading may be multivalued image data or binary image data. The generated binary image data is used not only for generation of a PDF file to be transmitted to the client PC 102 but also for printing by the printer 205. The first binarization processing is performed in units of several lines with use of the RAM 203. Thus, the RAM 203 does not store the entire page of the multivalued image data. The first binarization processing may be binarization screen processing or a dithering method using a dithering matrix if the first binarization processing is a halftone processing that is binarization processing through which pseudo-gradation is able to be expressed.

Figure 7:
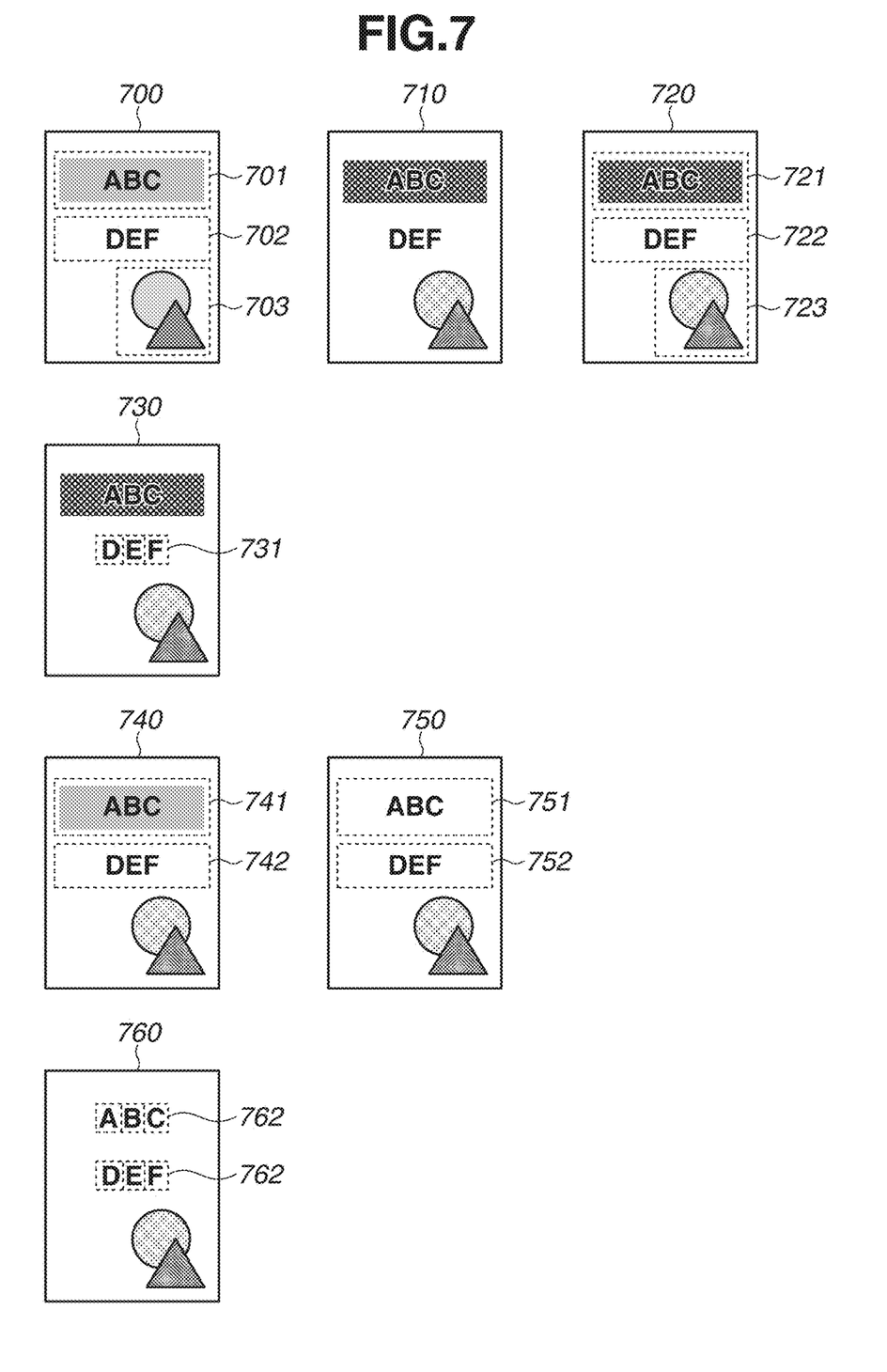
FIG. 7 is a diagram illustrating an example of image data generated by the MFP.

FIG. 7 illustrates an example of the multivalued image data generated through reading of an image of a document. FIG. 7 is a diagram illustrating an example of the image data generated by the MFP 101. Multivalued image data 700 includes a character string "ABC" 701 on a background, a character string "DEF" 702 on a white base, and a FIG. 703. Binary image data 710 is generated from the multivalued image data 700 by the CPU 201 running the first binarization processing unit 304 to perform binarization by using the error diffusion method. In the binary image data 710, error diffusion is performed on the character string 701 on the background in the multivalued image data 700, and, for example, isolated pixels caused by the error diffusion dot around the character string 701. Such binary image data 710 is not suitable for OCR processing (described below), and the character string 701 may not be recognized as a character or may be erroneously recognized.

The CPU 201 runs a region determination unit 305 to divide the generated binary image data into a plurality of regions, and detects character regions and photo image regions from the regions. The details of a region determination method will be described with reference to FIG. 7.

First, the CPU 201 traces an outline of eight-connected black pixels in the binary image data 710 to extract blocks of black pixels (black pixel blocks) continuously present in any of eight directions. The eight-connection indicates continuation of pixels of the same color in any of eight directions of upper left, left, lower left, bottom, lower right, right, upper light, and top. Four-connection indicates continuation of pixels of the same color in any of four directions of left, bottom, right, and top.

Second, if a black pixel block having a size exceeding a predetermined size (e.g., a black pixel block surrounding a region exceeding a predetermined size (area)) is included in the extracted black pixel blocks, the CPU 201 determines whether a block of white pixels (white pixel block) is present in the region. In other words, the CPU 201 traces an outline of four-connected white pixels in the region to extract a white pixel block. In a case where the extracted white pixel block has a size exceeding a predetermined size, the CPU 201 traces an outline of black pixels again in a similar manner to extract black pixel blocks. These processes are repeatedly performed until the size of the pixel block becomes equal to or lower than the predetermined size.

The CPU 201 classifies the obtained black pixel blocks into a character group or a phot-image group with use of at least one of a size, a shape, and a black pixel density. For example, the CPU 201 determines a black pixel block having an aspect ratio close to one (i.e., within 1±α, α is fixed threshold, e.g., 0.1) and a size within a predetermined range (e.g., number of pixels surrounded by black pixel block is equal to or lower than 100), as a black pixel block forming a character. The CPU 201 then determines the remaining black pixel blocks as pixel blocks forming a photo-image.

In a case where a distance between the black pixel blocks forming a character(s) is within a predetermined distance (e.g., three pixels), the CPU 201 classifies the black pixel blocks into the same group. Thereafter, the CPU 201 determines circumscribed rectangular regions each including all of the black pixel blocks classified into the same group, as character regions 721 and 722. The black pixel block forming a character separate from the other black pixel blocks forming a character by a predetermined distance or more, solely forms a single group. Thus, the circumscribed rectangular region for the single black pixel block is determined as a character region. The processing similar to the above-described processing is performed on the black pixel blocks configuring a photo image.

A position of each region and attribute determination information about each region are output as a determination result. The attribute determination information indicates whether the region is a character region or a photo image region.

Through the processing described above, a region determination is enabled for the character regions 721 and 722 and the photo image region 723 as with binary image data 720.

The CPU 201 runs a first OCR processing unit 306 to perform character extraction processing on a region determined as the character region, and performs character recognition processing on individual character-circumscribed rectangles. The character extraction processing and the character recognition processing will be described with reference to FIG. 7.

Binary image data 730 in FIG. 7 is binary image data including a character region having been subjected to the character extraction processing. In the character extraction processing, a circumscribed rectangle of each character is extracted into a character-circumscribed rectangle from the character region, based on projection in a lateral direction and projection in a vertical direction. The CPU 201 performs well-known character recognition processing with reference to the character-circumscribed rectangle information, thus obtaining a character code as character information. A character-circumscribed rectangle 731 in FIG. 7 is a result of the character extraction processing performed on the character region 722. Performing of the character recognition processing on each of the character-circumscribed rectangles, character codes corresponding to "D", "E", and "F" of the respective characters are obtained. The CPU 201 stores the obtained character codes in the RAM 203.

Figure 6:
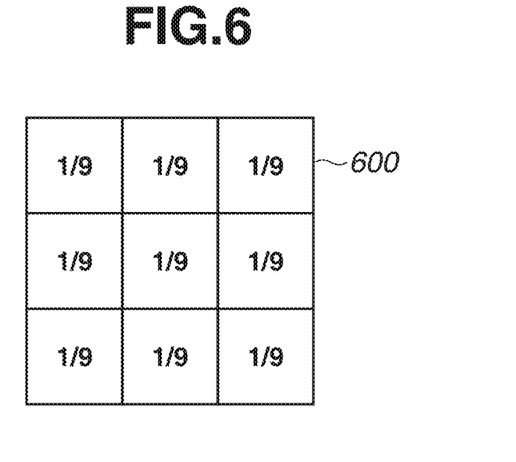
FIG. 6 is a diagram illustrating an example of a low-pass filter.

The CPU 201 runs a descreen processing unit 307 to perform descreen processing on the region determined as the character region. The descreen processing is smoothing processing to smooth the isolated pixels. In the present exemplary embodiment, convolution operation is performed on all of the pixels in the character region with use of, for example, a low-pass filter 600 that is a three-by-three matrix illustrated in FIG. 6, to perform the descreen processing on the binary image data. FIG. 6 is a diagram illustrating an example of the low-pass filter.

The descreen processing is performed because character recognition is not accurately performed on the character region in which the isolated pixels dot around a character due to binarization by using the error diffusion method, as in the character region 721. Furthermore, the multivalued image data before the binarization by using the error diffusion method is not stored, and thus, re-binarization is not performable with use of the multivalued image data. Performing the descreen processing on the character regions 721 and 722 of the binary image data 720 in FIG. 7 generates image data in which the isolated pixels are smoothed, as in character regions 741 and 742 of multivalued image data 740. The character regions 741 and 742 are not binary image data but are multivalued image data. Thus, re-binarization is necessary.

The CPU 201 runs a second binarization processing unit 308 to perform second binarization processing different from the first binarization processing on the descreen-processed character region. The second binarization processing is simple binarization processing in which a threshold is calculated from the luminance histogram of the character region and binarization is performed with use of the threshold. The details of the processing will be described with reference to FIGS. 9A and 9B.

Figure 9A:
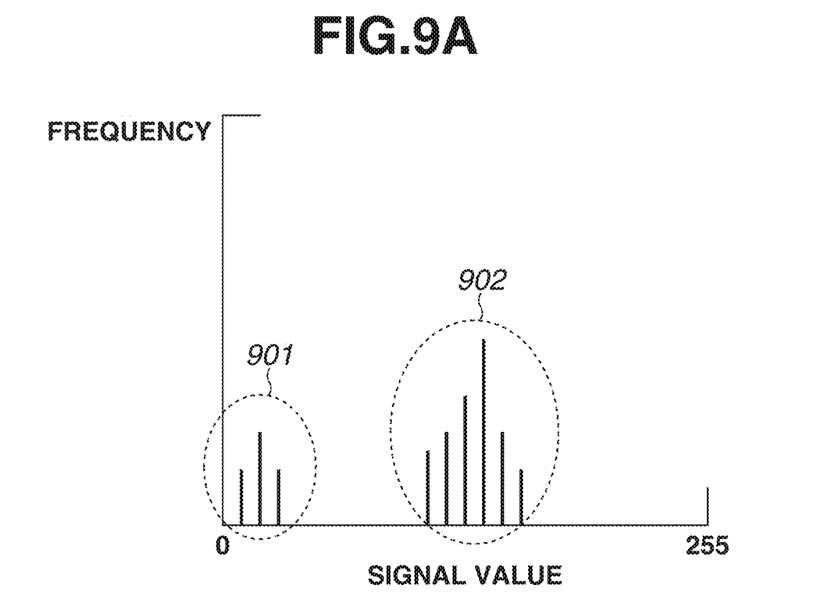
FIGS. 9A and 9B are diagrams each illustrating an example of a luminance histogram generated by the MFP.
Figure 9B:
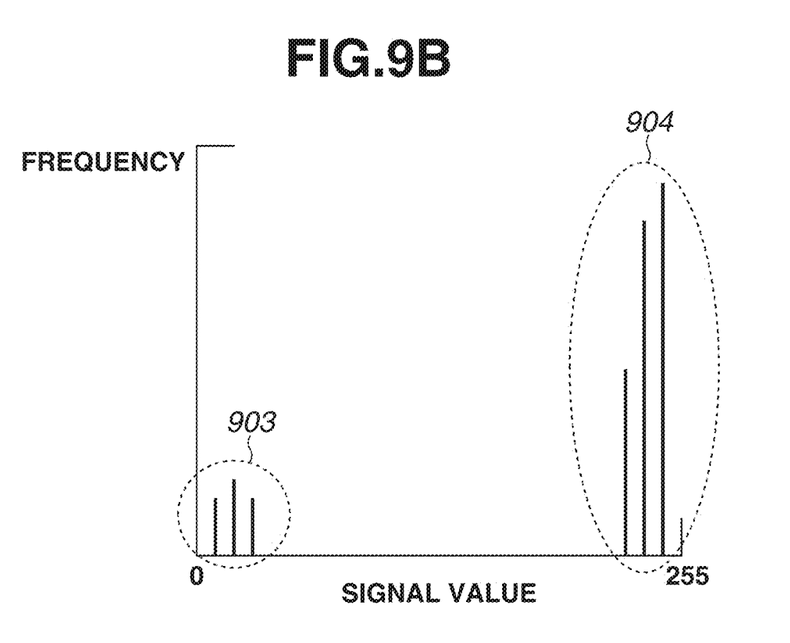

FIGS. 9A and 9B illustrate an example of the luminance histogram of the regions in the multivalued image data 740. FIGS. 9A and 9B are diagrams each illustrating an example of the luminance histogram generated by the MFP 101. FIG. 9A illustrates an example of a luminance histogram of the character region 741 of the multivalued image data 740. A lateral axis of the luminance histogram indicates an 8-bit image signal value (luminance value), and a range thereof is 0 to 255. A larger image signal value indicates brighter color (higher luminance). A vertical axis indicates a frequency of the image signal value.

A distribution 901 is a luminance distribution corresponding to the character pixel "ABC" part of the character region 741. A distribution 902 is a luminance distribution corresponding to the background pixels part of the character region 741. A threshold to separate the background pixels and the character pixels between the distribution 901 and the distribution 902 is calculated. Here, the background pixels form the background, and the character pixels form a character(s).

FIG. 9B is a diagram illustrating an example of a luminance histogram of the character region 742 of the multivalued image data 740. A distribution 903 is a luminance distribution corresponding to the character pixel "DEF" part of the character region 742. A distribution 904 is a luminance distribution corresponding to the background pixel part of the character region 742. A threshold to separate the background pixels and the character pixels between the distribution 903 and the distribution 904 is similarly calculated.

The pixel having a luminance value higher than the calculated threshold is converted into a black pixel and the pixel having a luminance value equal to or lower than the threshold is converted into a white pixel, thus performing binarization on the multivalued image data. The binarization performed at this time may be performed with not a combination of black and white but a combination of other colors or a combination of 1 and 0.

The thresholds are calculated from the luminance histograms of the character regions 741 and 742 of the multivalued image data 740 and the binarization is performed with use of the thresholds in the above-described manner. As a result, binary character regions 751 and 752 are generated.

The CPU 201 runs a second OCR processing unit 309 to perform the character extraction processing on the re-binarized region in a manner similar to the first OCR processing unit 306, and performs the character recognition processing on each of character-circumscribed rectangles. In the present exemplary embodiment, the first OCR processing unit 306 and the second OCR processing unit 309 are separate units for convenience of description; however, a common OCR processing unit may be used.

Binary image data 760 in FIG. 7 illustrates a result of the character recognition processing performed on the re-binarized binary image data. The character recognition processing is performed with reference to the character-circumscribed rectangle information, thus obtaining character codes. Character-circumscribed rectangles 761 and 762 in FIG. 7 are respectively results of the character extraction processing performed on the character regions 751 and 752. Performing the character recognition processing on each of the character-circumscribed rectangles obtains character codes corresponding to "A", "B", "C", "D", "E", and "F" of the respective characters. The CPU 201 stores the obtained character codes in the RAM 203.

The CPU 201 runs an OCR result combining unit 310 to combine the character codes that have been obtained by the CPU 201 running the first and second OCR processing units 306 and 309 and stored in the RAM 203. The CPU 201 combines the character codes corresponding to "D", "E", and "F" with the character codes corresponding to "A", "B", "C", "D", "E", and "F" obtained in the above-described example. In a case where character codes are overlapped in a character region at the same coordinates, any of the character code is deleted. In a case where different character codes are obtained in a character region at the same coordinates, a character code having higher OCR reliability (described below), namely, the character code having a higher probability of a correct character code (higher accuracy) may take precedence. The OCR reliability will be described below with reference to FIG. 5. While the descreen processing is performed on all of the character regions in the present exemplary embodiment, the descreen processing may be performed only on a specific region, for example, only on a region that is displayed with halftone dots as a result of the error diffusion processing. With this configuration, the second OCR processing is not performed on a region where the character codes are accurately obtainable through the first OCR processing, which eliminates overlapping of the character codes in the same character region. The character code obtained by the first OCR processing unit may be used, taking precedence, in consideration of error determination made through the descreen processing.

The CPU 201 runs a file generation unit 311 to generate a PDF file including the binary image data generated by the first binarization processing unit 304 and the character codes combined by the OCR result combining unit 310. An example of the PDF file generated at this time will be described with reference to FIG. 10.

Figure 10:
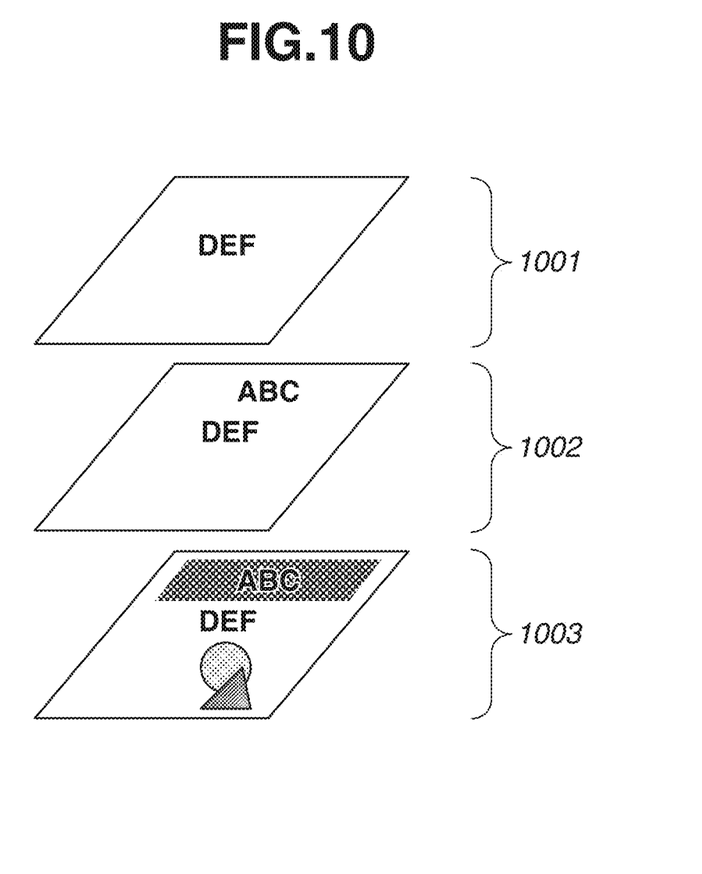
FIG. 10 illustrates an example of the PFD file generated by the MFP.

FIG. 10 is a diagram illustrating an example of the PDF file generated by the MFP 101. A PDF file 1000 generated by the file generation unit 311 includes three layers.

A layer 1001 includes the character codes obtained by the first OCR processing unit 306. The character codes corresponding to "D", "E", and "F" are drawn in a transparent color to be hidden and be searchable for.

A layer 1002 includes the character codes obtained by the second OCR processing unit 309. The character codes corresponding to "A", "B", "C", "D", "E", and "F" are drawn in a transparent color to be hidden and be searchable for.

A layer 1003 includes the binary image data generated by the first binarization processing unit 304. The binary image data may be subjected to binary lossless compression, such as Modified Modified READ (MMR) compression.

These layers 1001 to 1003 are combined and converted into a PDF file, thus generating a PDF file with an OCR result. For example, the generated file is transmitted to a destination designated by the user or is stored in the HDD 204 of the MFP 101.

Figure 4:
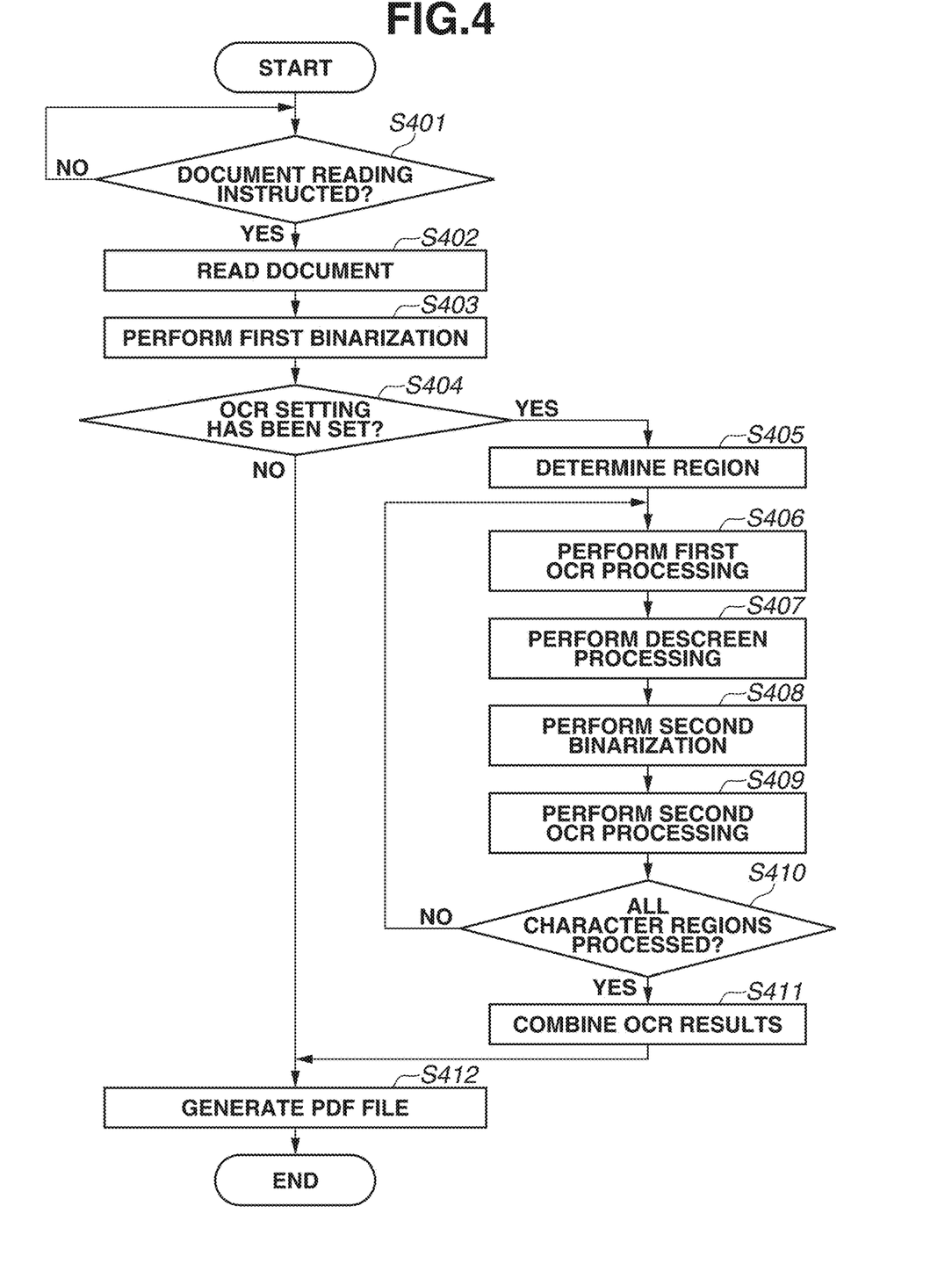
FIG. 4 is a flowchart illustrating an example of processing to be performed by the MFP to generate a portable document format (PDF) file with an optical character reader (OCR) result.

FIG. 4 is a flowchart illustrating an example of processing to be performed by the MFP 101 to generate the PDF file with the OCR result. The processing of the flowchart in FIG. 4 is implemented by the CPU 201 reading the program stored in the ROM 202 to the RAM 203 and executing the program. The processing in FIG. 4 is started when the MFP 101 is turned on.

In step S401, the CPU 201 determines whether a scan instruction has been received from the user via the operation unit 208. In a case where it is determined that the scan instruction has been received (YES in step S401), the processing proceeds to step S402. Otherwise (NO in step S401), the processing returns to step S401.

In step S402, the scanner 206 controlled by the CPU 201 reads an image of a document placed by the user, and generates image data. The image data generated at this time is multivalued image data.

In step S403, the CPU 201 performs the first binarization processing. In other words, the CPU 201 binarizes the multivalued image data generated in step S402 with use of the error diffusion method, and generates binary image data.

In step S404, the CPU 201 determines whether the user has set generation of a PDF file with an OCR result via the operation unit 208. In a case where it is determined that the setting has been turned on (YES in step S404), the processing proceeds to step S405. Otherwise (NO in step S404), the processing proceeds to step S412. An example of a screen that is displayed on the operation unit 208 and receives on/off setting of the OCR setting from the user will be described with reference to FIGS. 8A to 8C.

Figure 8A:
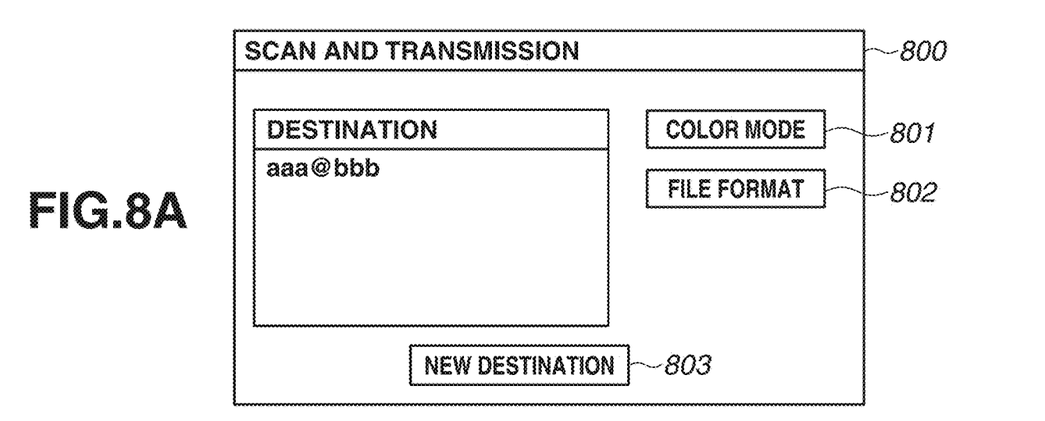
FIGS. 8A, 8B, and 8C are diagrams each illustrating an example of an OCR setting screen displayed on an operation unit.
Figure 8B:
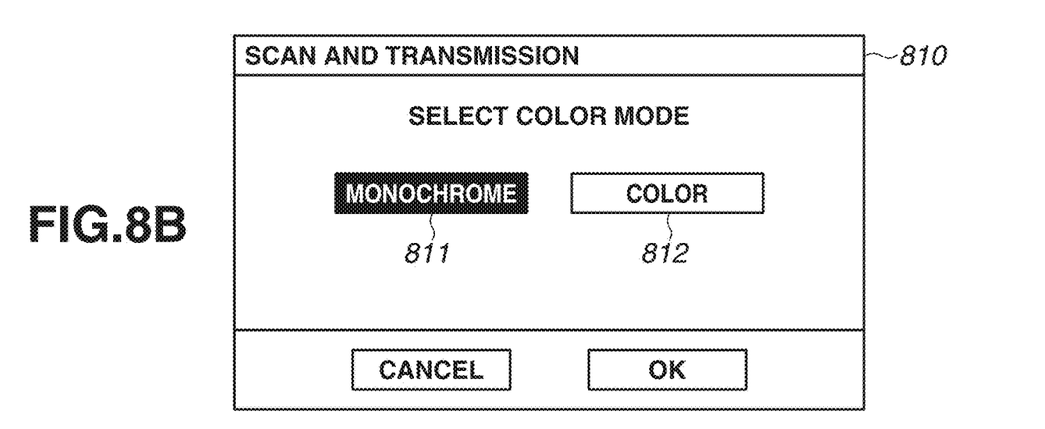
Figure 8C:
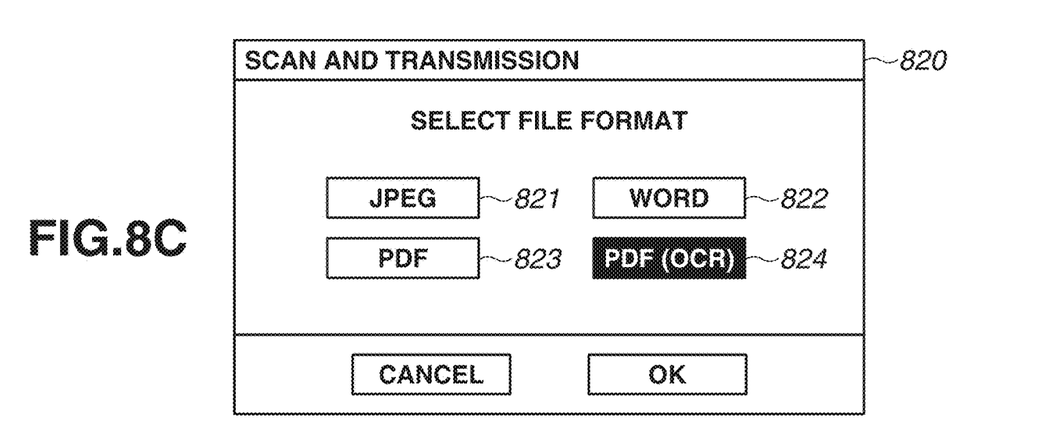

FIGS. 8A to 8C are diagrams each illustrating an example of an OCR setting screen displayed on the operation unit 208.

FIG. 8A is a diagram illustrating an example of the setting screen. Buttons 801 and 802 are displayed on a setting screen 800. The button 801 sets a color mode of image data to be transmitted by the MFP 101 when selected by the user. The button 802 sets a file format of the image data to be transmitted by the MFP 101 when selected by the user. A button is also displayed which sets a new destination input by the user as a transmission destination of the image data by the MFP 101 when selected by the user.

When the button 801 is selected, a setting screen 810 in FIG. 8B is displayed on the operation unit 208. FIG. 8B is a diagram illustrating an example of a color mode setting screen.

Buttons 811 and 812 are displayed on the setting screen 810. The button 811 sets a color mode to monochrome when selected by the user, and the button 812 sets a color mode to color when selected by the user.

When the button 802 of the setting screen 800 is selected, a setting screen 820 in FIG. 8C is displayed on the operation unit 208. FIG. 8C is an example of a file format setting screen.

Buttons 821 and 822 are displayed on the setting screen 820. The button 821 sets the file format of the image data to be transmitted to the client PC 102 by the MFP 101, to JPEG format. The button 822 sets the file format to MS-WORD format when selected by the user. Herein, MS-WORD indicates Microsoft (registered trademark) Word. Buttons 823 and 824 are displayed on the setting screen 820. The button 823 sets the file format of the image data to be transmitted to the client PC 102 by the MFP 101 to a PDF format when selected by the user. The button 824 sets the file format to a PDF format with an OCR result when selected by the user. The setting information (file format of image data, etc.) set on the setting screen 820 is stored in the RAM 203.

In step S405, the CPU 201 performs the region determination processing on the binary image data generated in step S403, to detect character regions and photo image region.

In step S406, the CPU 201 performs the first OCR processing on one of the regions determined as the character region in step S405 to obtain character codes, and stores the obtained character codes in the RAM 203.

In step S407, the CPU 201 performs the descreen processing on the character region that has been subjected to the first OCR processing in step S406, generating multivalued image data.

In step S408, the CPU 201 performs the second binarization processing different from the first binarization processing, on the descreen-processed character region in the multivalued image data generated in step S407, to generate binary image data. In the second binarization processing, simple binarization is performed on the multivalued image data generated through the descreen processing. The simple binarization is a method in which a threshold is calculated from the luminance histogram of the character region and binarization is performed with use of the threshold.

In step S409, the CPU 201 performs the second OCR processing on the character region having been subjected to the second binarization processing of the binary image data generated in step S408, and stores the obtained character codes in the RAM 203.

In step S410, the CPU 201 determines whether the processes in steps S406 to S409 have been performed on all of the character regions detected in step S405. If it is determined that the processing have been performed (YES in step S410), the processing proceeds to step S411. Otherwise (NO in step S410), the CPU 201 selects the character region not having been subjected to the processes in steps S406 to S409, and the processing returns to step S406.

In step S411, the CPU 201 combines the character codes (OCR results) stored in the RAM 203. For example, in a case where the character codes are overlapped in the same character region, any of the character codes is deleted. In a case where the same character codes are obtained in the same character region, one or both of the character codes may be used.

In step S412, the CPU 201 composites a layer in which the character code(s) obtained in step S411 is drawn in a transparent color and a layer in which the binary image data generated in step S403 is drawn, and generates a PDF file.

Performing the above-described processing enables the image processing apparatus performing the halftone processing to appropriately recognize the characters included in the read image and to improve the OCR performance without continuously storing the multivalued image data generated in reading of the document. This results in improvement in the OCR performance. Performing the descreen processing and then performing the simple binarization eliminates isolated points around the characters, thus improving the OCR performance.

Figure 5:
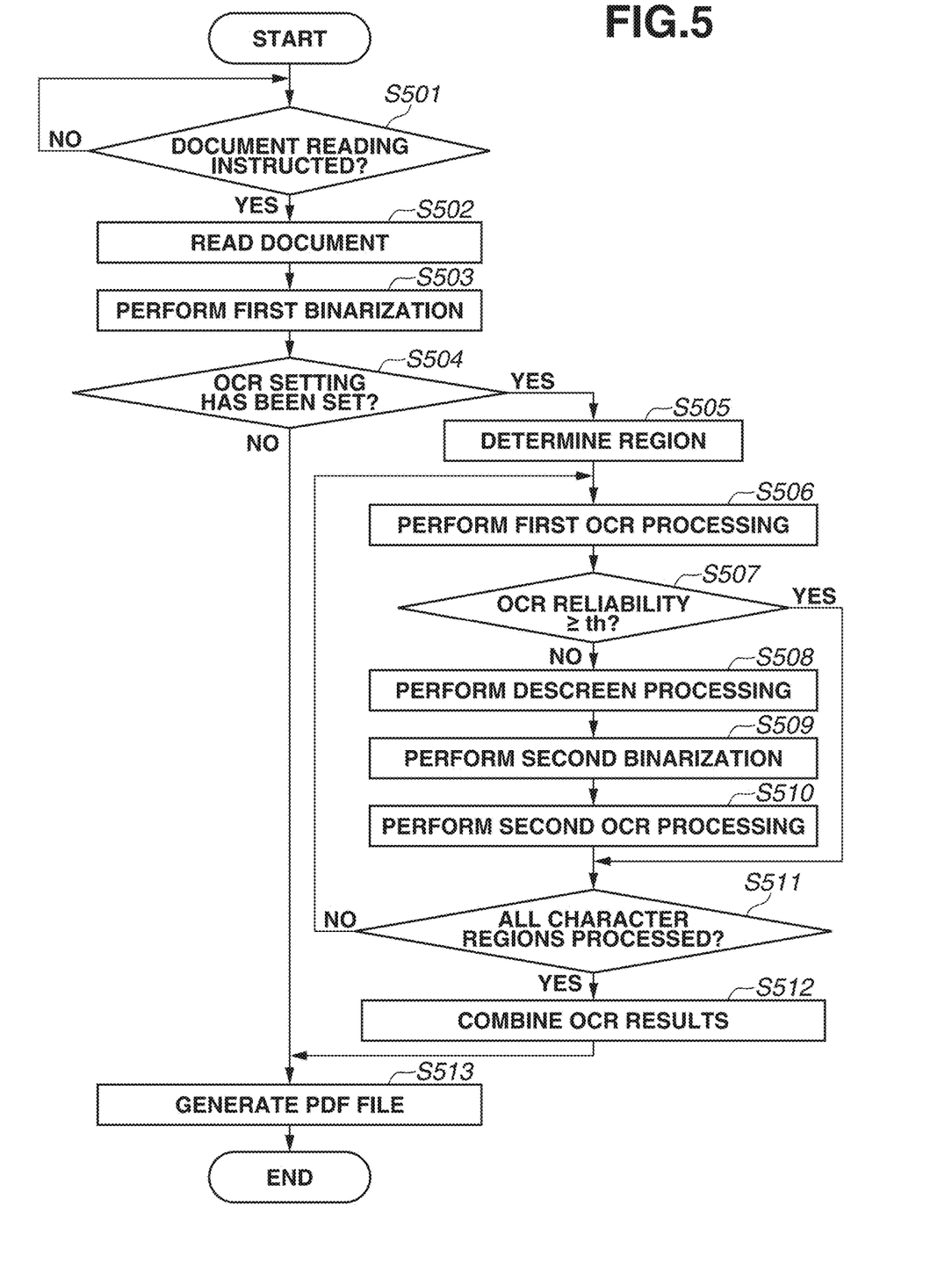
FIG. 5 is a flowchart illustrating an example of the processing to be performed by the MFP to generate a PDF file with an OCR result.

In the first exemplary embodiment, the configuration in which the first binarization is performed on the input data read by the scanner 206 has been described. The present disclosure, however, is applicable to a configuration in which the image data is received from the other MFP through the network 103. In such a case, the processes in steps S501 and S502 are replaced with processing of receiving the image data.

A second exemplary embodiment of the present disclosure will be described below. In the first exemplary embodiment, an example in which the descreen processing, the second binarization processing, and the second OCR processing are performed on all of the regions each determined as the character region has been described. In the present exemplary embodiment, a description will be provided of an example in which the descreen processing and other processing are performed only on a region with low OCR reliability based on the OCR reliability (OCR recognition rate) obtained through the first OCR processing, thus achieving high-speed processing. Differences between the first and second exemplary embodiments will be mainly described below.

FIG. 5 is a flowchart illustrating an example of processing to be performed by the MFP 101 to generate the PDF file with the OCR result. The processing of the flowchart in FIG. 5 is implemented by the CPU 201 reading the program stored in the ROM 202 to the RAM 203 and executing the program. The processing of the flowchart in FIG. 5 is started when the MFP 101 is turned on.

Processes in steps S501 to S506 are similar to those in steps S401 to S406 in FIG. 4, and description thereof is therefore omitted.

In step S507, the CPU 201 calculates the OCR reliability of the character region having been subjected to the OCR processing in step S506, and determines whether the OCR reliability is equal to or higher than a threshold (th). If it is determined that the OCR reliability is equal to or higher than the threshold (YES in step S507), the processing proceeds to step S511. If not, namely, in a case where the OCR reliability is lower than the threshold (NO in step S507), the processing proceeds to step S508. More specifically, in a case where the CPU 201 performs the first OCR processing, the CPU 201 compares a characteristic amount represented by the character pixels in the character-circumscribed rectangle with dictionary data previously stored in the ROM 202, by using pattern matching. The character closest to a shape represented by the character pixels is selected and a character code for the character is obtained. In the comparison of the character pixels in the character-circumscribed rectangle with the dictionary data previously stored in the ROM 202 by using the pattern matching, the CPU 201 also calculates character recognition accuracy at the same time. The accuracy is determined by, for example, comparing the character pixels in the character-circumscribed rectangle with the dictionary data by using the pattern matching and calculating a degree of closeness of a character represented by the recognized character code to the character pixels. The accuracy is calculated for each character (character-circumscribed rectangle). The CPU 201 further determines whether an average of the accuracies (OCR reliability) of the characters in the character region having been subjected to the OCR processing is equal to or higher than the threshold. In the present exemplary embodiment, the average of the accuracy of the characters in the character region is compared with the threshold; however, the comparison is not limited thereto, and it may be determined whether the accuracy of at least one of the characters in the character region is equal to or higher than the threshold, and the processing in steps S508 to S510 may be performed when the accuracy of at least one of the characters is equal to or higher than the threshold.

Processing in steps S508 to S513 are similar to the processing in steps S407 to S412, and description thereof is therefore omitted.

Performing of the above described processing enables the image processing apparatus that does not continuously store the multivalued image data before binarization to increase the recognition rate of a character included in a read image, in.

It is possible to improve the recognition rate of a character included in a read image in the image processing apparatus that does not continuously store the multivalued image data before binarization.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-202033, filed Oct. 26, 2018, which is hereby incorporated by reference herein in its entirety.

What is claimed is:

1. An image processing apparatus, comprising:
a reader that reads an image of a document and generate image data; and
at least one processor or at least one circuit that causes the image processing apparatus to:
generate binary image data by performing halftone processing on the generated image data;
detect a character region of the generated binary image data;
perform smoothing processing on at least the detected character region;
perform binarization processing on the character region having been subjected to the smoothing processing; and
perform character recognition processing on the character region having been subjected to the binarization processing.

2. The image processing apparatus according to claim 1, further comprising a storage that stores character information obtained by first character information and second character information being combined, the first character information being obtained as a result of character recognition processing that is performed on a character region of the generated binary image data, the second character information being obtained as a result of the character recognition processing that is performed on the character region having been subjected to the binarization processing.

3. The image processing apparatus according to claim 2, wherein the at least one processor or the at least one circuit generates a portable document format (PDF) file by adding, to the generated binary image data, the character information with the first character information and the second character information being combined, the character information being stored in the storage.

4. The image processing apparatus according to claim 3, wherein the at least one processor or the at least one circuit generates a PDF file by adding, to the image data, character information having a higher recognition rate out of the first character information and the second character information, the recognition rate of the first character information being obtained as a result of the character recognition processing that is performed on a character region of the generated binary image data, the recognition rate of the second character information being obtained as a result of the character recognition processing performed on a character region that has been subjected to the binarization processing and has a same coordinates as those of the character region from which the first character information is obtained.

5. The image processing apparatus according to claim 1,
wherein the at least one processor or the at least one circuit does not perform the smoothing processing on the character region of the binary image data based on a recognition rate of first character information being equal to or higher than a threshold, the recognition rate of the first character information being obtained as a result of an optical character reader (OCR) processing that is performed on a character region of the generated binary image data, and
wherein the at least one processor or the at least one circuit performs the smoothing processing on the character region of the binary image data based on the recognition rate of the first character information being lower than the threshold, the recognition rate of the first character information being obtained as a result of the OCR processing that is performed on a character region of the generated binary image data.

6. The image processing apparatus according to claim 1, further comprising a user interface that receives setting as to whether the at least one processor or the at least one circuit performs the character recognition processing.

7. The image processing apparatus according to claim 1, wherein the binarization processing on the character region having been subjected to the smoothing processing is simple binarization processing.

8. The image processing apparatus according to claim 1, wherein the simple binarization processing is processing in which a threshold is calculated from a luminance histogram of the character region and binarization is performed with use of the threshold.

9. The image processing apparatus according to claim 1, wherein the halftone processing includes binarization processing using an error diffusion method.

10. The image processing apparatus according to claim 9, wherein the binarization processing on the character region having been subjected to the smoothing processing is simple binarization processing.

11. The image processing apparatus according to claim 10, wherein the simple binarization processing is processing in which a threshold is calculated from a luminance histogram of the character region and binarization is performed with use of the threshold.

12. The image processing apparatus according to claim 1, wherein the halftone processing includes binarization processing using a dithering method.

13. The image processing apparatus according to claim 1, wherein the halftone processing includes binary screen processing.

14. An image processing method, comprising:
generating, as first binzarization, binary image data by performing halftone processing on image data;
detecting a character region of the generated binary image data;
performing smoothing processing on at least the character region;
performing, as second binzarization, binarization processing on the character region having been subjected to the smoothing processing; and
performing character recognition processing on the character region having been subjected to the simple binarization processing in the second binarization.

15. A non-transitory computer-readable storage medium that stores a program for causing a computer to execute a method for controlling an image processing apparatus, the method comprising:
generating, as first binarization, binary image data by performing halftone processing on image data;
detecting a character region of the generated binary image data;
performing smoothing processing on at least the character region;
performing, as second binarization, binarization processing on the character region having been subjected to the smoothing processing; and
performing character recognition processing on the character region having been subjected to the simple binarization processing in the second binarization.

* * * * *